United States Patent
Ikeuchi

(10) Patent No.: US 9,337,768 B2
(45) Date of Patent: May 10, 2016

(54) MOTOR CONTROL DEVICE, WALKING ASSIST DEVICE, AND MOTOR CONTROL METHOD

(71) Applicant: HONDA MOTOR CO., LTD., Tokyo (JP)

(72) Inventor: Yasushi Ikeuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 795 days.

(21) Appl. No.: 13/672,220

(22) Filed: Nov. 8, 2012

(65) Prior Publication Data

US 2013/0123671 A1 May 16, 2013

(30) Foreign Application Priority Data

Nov. 10, 2011 (JP) .................................. 2011-246865

(51) Int. Cl.
H02P 29/00 (2006.01)
A61H 3/00 (2006.01)
A61H 1/02 (2006.01)

(52) U.S. Cl.
CPC .......... *H02P 29/0055* (2013.01); *A61H 1/0255* (2013.01); *A61H 3/00* (2013.01); *A61H 2201/1215* (2013.01); *A61H 2201/1463* (2013.01); *A61H 2201/165* (2013.01); *A61H 2201/1633* (2013.01); *A61H 2201/1642* (2013.01); *A61H 2201/1652* (2013.01)

(58) Field of Classification Search
CPC .................................................. H02P 29/0055
USPC ..................................................... 318/504, 641
See application file for complete search history.

(56) References Cited

U.S. PATENT DOCUMENTS

| | | | | |
|---|---|---|---|---|
| 5,510,687 A | * | 4/1996 | Ursworth | ............. H02H 7/0833 |
| | | | | 318/471 |
| 5,923,135 A | * | 7/1999 | Takeda | ................ B60L 11/1803 |
| | | | | 318/432 |
| 7,911,167 B2 | * | 3/2011 | Takeuchi | .................. B60L 3/06 |
| | | | | 180/65.1 |

FOREIGN PATENT DOCUMENTS

| | | |
|---|---|---|
| JP | 10-014283 | 1/1998 |
| JP | 2002-238293 | 8/2002 |
| JP | 2007-282478 | 10/2007 |
| JP | 2008-109816 | 5/2008 |
| JP | 2009-297305 | 12/2009 |

OTHER PUBLICATIONS

Japanese Office Action dated Sep. 16, 2014, 3 pages.

* cited by examiner

*Primary Examiner* — David S Luo
(74) *Attorney, Agent, or Firm* — Rankin, Hill & Clark LLP

(57) ABSTRACT

A motor control device includes: a coil temperature detection unit which detects a coil temperature of a motor; an upper limit current determination unit which determines an upper limit value of a coil current in which a coil temperature after a lapse of a first predetermined time from the present is maintained at an upper limit temperature or lower, every time a second predetermined time shorter than the first predetermined time elapses, by using a coil temperature detected by the coil temperature detection unit; and a coil current control unit which controls the coil current so as to be equal to or lower than the upper limit value.

7 Claims, 11 Drawing Sheets

MOTOR CONTROL DEVICE, WALKING ASSIST DEVICE, AND MOTOR CONTROL METHOD

BACKGROUND OF THE INVENTION

1. Field of the Invention

The present invention relates to a motor control device which prevents overheating of a motor coil, a walking assist device equipped with the motor control device, and a motor control method.

2. Description of the Related Art

In a motor provided in a walking assist device or the like, a coil is maintained in an energized state in order to keep a rotation angle not only during rotation, but also during stop of rotation. The coil is heated along with energization. If a heating value of the coil exceeds a heat discharge value thereof, the temperature of the coil rises, thereby placing the coil in an overheated state. Therefore, it is necessary to protect the coil not to reach the overheating temperature during use of the motor.

Patent Document 1 (Japanese Patent Application Laid-Open No. 2002-238293) discloses that motor current is limited on the basis of an integrated value of a predetermined function of a phase current or an integrated value of a power function of a phase current as a countermeasure against overheating of a three-phase motor (paragraph 0047 in Patent Document 1). Patent Document 1 also discloses that, in the three-phase motor, an integrated value of a phase current is calculated for each phase to limit all phase currents on the basis of the integrated value in a phase having the maximum integrated value (paragraph 0036 in Patent Document 1).

Patent Document 2 (Japanese Patent Application Laid-Open No. 2007-282478) discloses that, in a brushless DC motor, calculation is made to obtain an integrated value of a difference between an integrated value of a phase current or a function value of a predetermined function of a phase current and a threshold value, the temperature of a permanent magnet is subsequently predicted on the basis of the integrated value and an intermediate bus voltage of an inverter, and then the maximum current of the motor is limited on the basis of the predicted temperature (paragraph 0037 in Patent Document 2).

In the conventional countermeasures against overheating of a motor, a phase current is limited according to the present phase current, the present integrated value obtained by integration of the phase current, or the present values of other functions, and therefore the phase current is not limited on the basis of whether the coil temperature obtained after the lapse of the predetermined time from the present reaches the overheating temperature. In the conventional countermeasures against overheating of the motor, in order to deal with a time delay which occurs until the coil temperature actually decreases or an overshoot of the coil temperature after starting control of decreasing the phase current, the threshold value is set to a value corresponding to a temperature sufficiently lower than a guaranteed upper limit temperature of the coil to control the present various values so as to be lower than the threshold. Therefore, in the conventional countermeasures against overheating of the motor, the setting of the threshold value corresponding to the lower temperature suppresses the coil current earlier though the coil current is still able to be increased, by which the motor performance is not fully used.

Therefore, it is an object of the present invention to provide a motor control device, a walking assist device equipped with the motor control device, and a motor control method capable of setting the upper limit of a coil temperature to a value sufficiently close to a guaranteed upper limit temperature while securing that the coil temperature does not exceed the upper limit, thereby suppressing the limitation on the coil current.

SUMMARY OF THE INVENTION

According to one aspect of the present invention, there is provided a motor control device including: a coil temperature detection means which detects a coil temperature of a motor; an upper limit current determination means which determines an upper limit value of a coil current in which a coil temperature after a lapse of a first predetermined time from the present is maintained at an upper limit temperature or lower every time a second predetermined time shorter than the first predetermined time elapses by using a coil temperature detected by the coil temperature detection means; and a coil current control means which controls the coil current so as to be equal to or lower than the upper limit value.

According to the aspect of the invention, the upper limit value of the coil current is determined by using the coil temperature detected by the coil temperature detection means every time the second predetermined time shorter than the first predetermined time elapses so that the coil temperature after the lapse of the first predetermined time remains at the upper limit temperature or lower and the coil current is controlled to be equal to or lower than the upper limit value. Thereby, even if the coil current of the upper limit value is supplied to the coil, it is guaranteed that the coil temperature is maintained at the upper limit temperature or lower in the first predetermined time. In addition, the upper limit value of the coil current is updated every time the second predetermined time shorter than the first predetermined time as a guarantee period elapses and the guarantee period starts at the update time point and ends after the lapse of the first predetermined time, and therefore as long as this cycle is repeated, the coil temperature is prevented from reaching the upper limit temperature.

In the conventional motor control device, a threshold value is statically set to a value sufficiently lower value than the guaranteed upper limit temperature of the coil in consideration of a control delay and an overshoot as described above. In addition, the conventional motor control device has compared the present coil temperature with the predetermined static threshold value and has reduced the coil current if the coil temperature exceeds the threshold value. In contrast thereto, according to the aspect of the present invention, the actual coil temperature does not exceed the upper limit temperature during the control of the coil temperature. Therefore, the upper limit temperature is able to be set up to a value close to the guaranteed upper limit temperature of the coil without consideration of the control delay and the overshoot. Thereby, the coil current is able to be increased until the present coil temperature reaches a temperature range higher than the threshold value in the conventional motor control device, which enables the limitation on the coil current, which leads to a decrease in the motor performance, to be suppressed as much as possible.

In the motor control device, the upper limit current determination means is able to determine the upper limit value of the coil current by using the present coil temperature as a coil temperature and using the upper limit temperature and the first predetermined time.

According thereto, the upper limit value of the coil current is able to be obtained easily and quickly by using the present coil temperature, the upper limit temperature of the coil, and the first predetermined time.

In the motor control device, the motor is a three-phase motor, the coil temperature detection means detects a coil temperature for each phase of the three-phase motor, the upper limit current determination means determines the upper limit value for each phase on the basis of the individual-phase coil temperature, and the coil current control means is able to control each individual-phase coil current so as to be equal to or lower than each individual-phase upper limit value.

According to the motor control device, in the case where the motor is a three-phase motor, it is possible to suppress the limitation on the coil current which leads to a decrease in motor performance, while guaranteeing that the coil temperature does not exceed the upper limit in each phase.

In the motor control device, the coil current control means is able to set a circle having a radius corresponding to a minimum individual-phase upper limit value among three individual-phase upper limit values with the origin as a center in a d-q coordinate system in which three individual-phase coil currents are represented by one vector with respect to the three individual-phase upper limit values determined for each phase by the upper limit current determination means, and with respect to a target vector which has the length corresponding to a required torque to the motor and rotates around the origin in synchronization with the rotation of the motor, is able to correct the length of the target vector so that the tip thereof is contained within the circle in the case where the tip is located outside the circle, and is able to control the respective individual-phase coil currents on the basis of the target vector whose length is corrected.

According to the motor control device, there is set a circle which has a radius having a length corresponding to the minimum individual-phase upper limit value among three individual-phase upper limit values with the origin as a center in the d-q coordinate system, and in the case where the tip of the target vector is located outside the circle with respect to the target vector, the length of the target vector is corrected so that the tip thereof is contained within the circle, and the coil current of each phase is calculated on the basis of the target vector after the correction. This enables the limitation on the coil current to be suppressed as much as possible while guaranteeing that the coil temperature in each phase does not exceed the upper limit. Thus, three individual-phase coil currents are limited by one individual-phase upper limit value and therefore the control is simplified and a smooth high-speed rotation is achieved.

In the motor control device, the coil current control means is able to set a polygon in which opposite sides are in parallel to each other and a distance between the opposite sides corresponds to a double or less than the corresponding individual-phase upper limit value in a d-q coordinate system in which three individual-phase coil currents are represented by one vector with respect to the three individual-phase upper limit values determined for each phase by the upper limit current determination means, and with respect to a target vector which has the length corresponding to a required torque to the motor and rotates around the origin in synchronization with the rotation of the motor, is able to correct the length of the target vector so that the tip thereof is contained within the polygon in the case where the tip is located outside the polygon, and is able to control the respective individual-phase coil currents on the basis of the target vector whose length is corrected.

According to the motor control device, there is set a polygon in which opposite sides are in parallel to each other and a distance between the opposite sides corresponds to a double or less than the absolute value of the corresponding individual-phase upper limit value in a d-q coordinate system, and in the case where the tip of the target vector is outside the polygon with respect to the target vector, the length of the target vector is corrected so that the tip thereof is contained within the polygon, and the respective individual-phase coil currents are calculated on the basis of the target vector after the correction. As a result, in the case where the temperature environment varies with each phase coil, the coil current of each phase is limited to a value equal to or lower than the upper limit value determined for each phase. Therefore, the limitation on the coil current is able to be suppressed in comparison with the case of uniformly setting the upper limit value irrespective of phase.

In the motor control device, the coil current control means is able to set a circle having a radius corresponding to a minimum individual-phase upper limit value among three individual-phase upper limit values with the origin as a center and a polygon in which opposite sides are in parallel to each other and a distance between the opposite sides corresponds to a double or less than an absolute value of the corresponding individual-phase upper limit value in a d-q coordinate system in which three individual-phase coil currents are represented by one vector with respect to the three individual-phase upper limit values determined for each phase by the upper limit current determination means, and with respect to a target vector which has the length corresponding to a required torque to the motor and rotates around the origin in synchronization with the rotation of the motor, is able to correct the length of the target vector so that the tip thereof is contained within the circle in the case where the tip of the target vector is located outside the circle during a period in which the rotation speed of the three-phase motor is equal to or greater than a predetermined value and to correct the length of the target vector so that the tip thereof is contained within the polygon in the case where the tip of the target vector is located outside the polygon during a period in which the rotation speed of the three-phase motor is less than the predetermined value, and is able to control the respective individual-phase coil currents on the basis of the target vector which has been corrected.

According to the motor control device, the coil temperatures in all phases are able to be maintained at a temperature equal to or lower than the upper limit temperature at an arbitrary time point and it is possible to achieve smooth high-speed rotation and to secure the individual-phase maximum torque during low-speed rotation or during stop of rotation.

According to another aspect of the present invention, there is provided a walking assist device including: the aforementioned motor control device; a joint which pivotally supports a thigh frame and a crus frame; and an actuator which contains a motor controlled by the motor control device, drives a joint by using a driving force of the motor, and controls a mutual angle between the thigh frame and the crus frame.

According to the aspect of the invention, the coil temperature is able to be maintained within the upper limit temperature while suppressing the limitation on the coil current so that the motor performance is able to be fully exerted, in spite of the fact that the coil temperature easily increases due to a usage where a high-output torque is required and the motor stops the rotation and rotates at a low speed for a relatively long period.

According to still another aspect of the present invention, there is provided a motor control method including: a coil temperature detection step of detecting a coil temperature of a motor; an upper limit current determination step of determining an upper limit value of a coil current in which a coil temperature after a lapse of a first predetermined time from the present is maintained at an upper limit temperature or lower every time a second predetermined time shorter than the first predetermined time elapses by using a coil temperature detected in the coil temperature detection step; and a coil current control step of controlling the coil current so as to be equal to or lower than the upper limit value.

According to the aspect of the invention, the upper limit value of the coil current is determined on the basis of the coil temperature so that the coil temperature after the lapse of the first predetermined time is maintained at the upper limit temperature or lower, every time the second predetermined time shorter than the first predetermined time elapses. Thereafter, the coil current is controlled so as to be equal to or lower than the upper limit value. As a result, the upper limit temperature after the lapse of the first predetermined time is able to be set to a value close to the guaranteed upper limit temperature of the coil without consideration of a control delay and an overshoot. Therefore, the coil current is able to be increased until the present coil temperature reaches a temperature higher than the threshold value in the conventional motor control method, thus enabling the limitation on the coil current, which leads to a decrease in motor performance, to be suppressed as much as possible.

DESCRIPTION OF THE PREFERRED EMBODIMENTS

Figure 1:
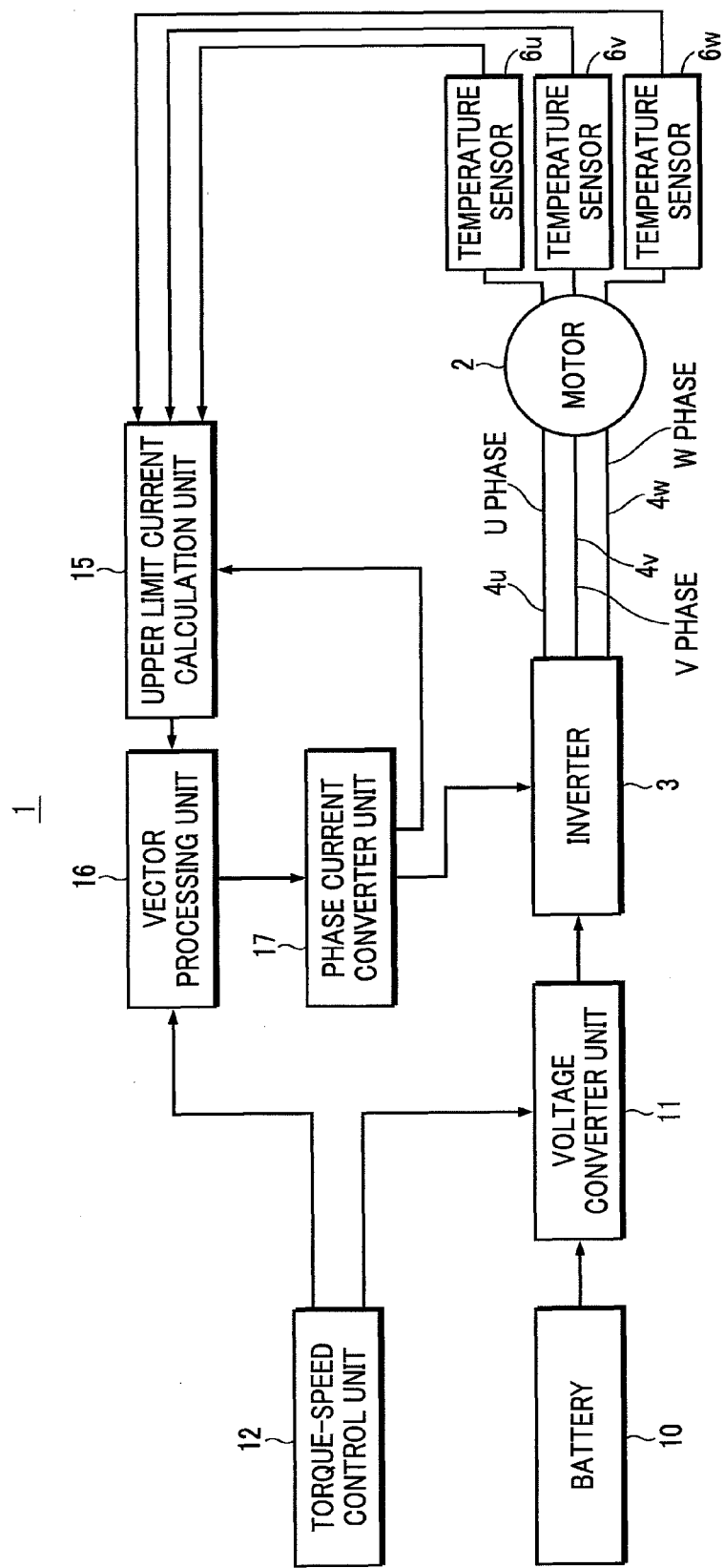
FIG. 1 is a configuration diagram illustrating a motor control device.

Referring first to FIG. 1, the main configuration of the motor control device 1 will be described below. A brushless DC motor 2 includes a three-phase motor in star connection and is supplied with U-, V-, and W-phase currents (coil currents) via three phase lines $4u$, $4v$, and $4w$ from an inverter 3.

Temperature sensors $6u$, $6v$, and $6w$ as coil temperature detection means detect the temperatures of the respective phase coils of the brushless DC motor 2. The respective phase coils are arranged in the circumferential direction at intervals of an electric angle 120° in a stator of the brushless DC motor 2.

The functions of a torque-speed control unit 12, an upper limit current calculation unit 15, a vector processing unit 16, and a phase current converter unit 17 are implemented by executing predetermined software by a microcomputer. The upper limit current calculation unit 15 as an upper limit current determination means receives inputs of information on the temperatures of the respective phase coils from temperature sensors $6u$, $6v$, and $6w$ and inputs of information on the present coil currents of the respective phases from the phase current converter unit 17. The upper limit current calculation unit 15 calculates the upper limit value of the phase current for each phase on the basis of the aforementioned input information. The concrete way of calculating the individual-phase upper limit values in the upper limit current calculation unit 15 will be described later with reference to FIG. 2 to FIG. 5. The upper limit current calculation unit 15 sends the information on the calculated individual-phase upper limit values to the vector processing unit 16.

The torque-speed control unit 12 calculates a target torque and a target rotational speed of the brushless DC motor 2 on the basis of various inputs. The various inputs include not only detection signals from sensors not illustrated, but also instructions or the like from a user. The user means a user of a walking assist device 50 in the case where the motor control device 1 is mounted on the walking assist device 50 (FIG. 10) described later.

The torque-speed control unit 12 outputs information on the calculated target rotational speed to a voltage converter unit 11, and the voltage converter unit 11 converts an output voltage of a battery 10 to a voltage corresponding to the target rotational speed and applies the converted voltage to an input terminal of the inverter 3. In addition, the torque-speed control unit 12 outputs information on the target rotational speed and the target torque calculated with respect to the brushless DC motor 2 to the vector processing unit 16.

The vector processing unit 16 generates a target vector in the d-q coordinate system on the basis of the information on the target rotational speed and the target torque of the brushless DC motor 2 and corrects the target vector on the basis of the information on the individual-phase upper limit value received from the upper limit current calculation unit 15. A concrete way to correct the target vector will be described later with reference to FIG. 2 to FIG. 9. The vector processing unit 16, the aforementioned inverter 3, and the voltage converter unit 11 are an example of the coil current control means of the present invention.

The vector processing unit 16 outputs information on the target vector obtained after correction (hereinafter, appropriately referred to as "correction vector") to the phase current converter unit 17. The phase current converter unit 17 calculates the phase current of each phase on the basis of the direction and length of the correction vector at each instant and outputs three control signals in total corresponding to the phase currents calculated for the respective phases to the inverter 3. In addition, the phase current converter unit 17 outputs the phase currents calculated for the respective phases as information on the present individual-phase currents to the upper limit current calculation unit 15. The upper limit current calculation unit 15 uses this information for the calculation of the upper limit value described later.

The inverter 3 receives three control signals for the respective U, V, and W phases from the phase current converter unit 17. The inverter 3 has inverter elements for the respective phase lines 4u, 4v, and 4w so as to correspond to the star connection in the brushless DC motor 2. The three control signals of the U, V, and W phases output from the phase current converter unit 17 to the inverter 3 for the respective phases are adapted to control the ON/OFF switching timing of the inverter elements provided in the phase lines 4u, 4v, and 4w, respectively. This enables the inverter 3 to control the phase currents of the brushless DC motor 2 to values calculated for the respective phases by the phase current converter unit 17.

Figure 2:
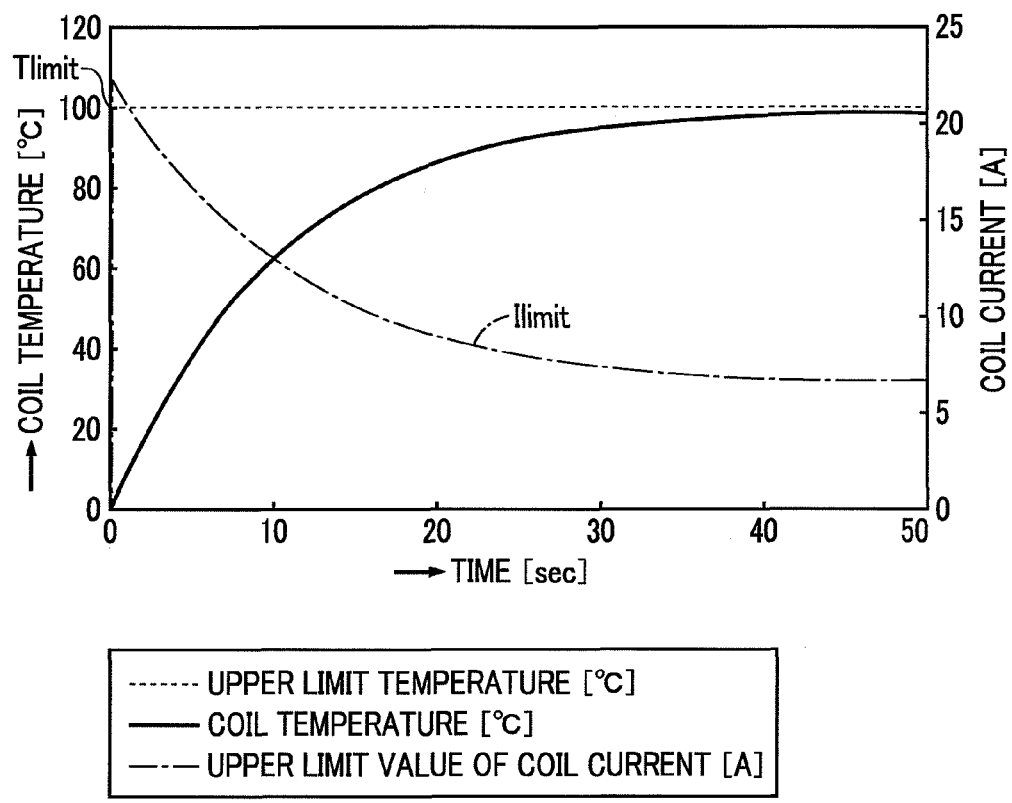
FIG. 2 is a diagram illustrating changes in coil temperature and coil current in the case of controlling coil current on the basis of an upper limit value of the coil current calculated by an upper limit current calculation unit.

FIG. 2 illustrates changes in coil temperature and coil current in the case of controlling coil current on the basis of an upper limit Ilimit calculated by the upper limit current calculation unit 15. In FIG. 2, the horizontal axis represents time with the present time as zero. The vertical axis represents the coil temperature and coil current. For convenience of description, FIG. 2 illustrates changes with respect to one phase on the assumption that the temperature environments of the three phase coils of the brushless DC motor 2 are the same.

In the coil current control associated with FIG. 2, the upper limit temperature Tlimit of the coil is set to 100° C. and the present coil temperature T is set to 0° C. In addition, the predetermined time tx used for the coil current control is defined. The predetermined time tx is used to calculate the upper limit value Ilimit of the coil current so that the coil temperature does not exceed the upper limit temperature Tlimit after the lapse of the predetermined time tx. The predetermined time tx is an example of first predetermined time of the present invention and is assumed to be ten seconds in the coil current control.

Concrete expressions (e11) to (e14), expressions (e21) and (e22), expressions (e31) to (e34), and expressions (e41) to (e45) used to calculate the upper limit value Ilimit of the coil current will be described later.

In the motor control device 1 which controls the coil current as illustrated in FIG. 2 so that the coil temperature changes as illustrated in FIG. 2, the upper limit value Ilimit of the present coil current is calculated and updated after each lapse of predetermined time ty so that the coil temperature obtained after the lapse of the predetermined time tx from the present always remains to be equal to or lower than the upper limit temperature Tlimit. In addition, the predetermined time ty is defined so as to satisfy ty<tx and is an example of second predetermined time of the present invention. Preferably, an integral multiple of the predetermined time ty is defined as the predetermined time tx. In this manner, the setting of the dynamic upper limit value Ilimit enables the coil current to be controlled so that the coil temperature does not exceed the upper limit temperature Tlimit though the coil temperature comes close to the upper limit temperature Tlimit considerably. As a result, the upper limit temperature Tlimit is able to be set to a value which is lower than and extremely close to the guaranteed upper limit temperature of the coil.

Figure 3:
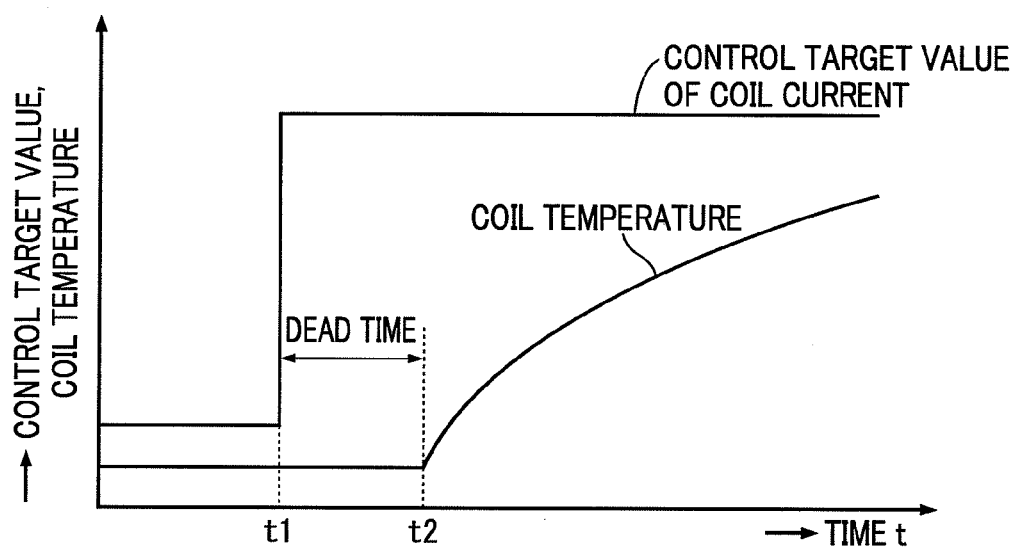
FIG. 3 is an explanatory diagram of dead time which occurs in controlling the coil current.

FIG. 3 is for use in describing the dead time in the case of controlling the coil current. Even if the control target value of the coil current is increased in steps at time t1, the coil temperature actually starts to increase at time t2 and therefore the dead time which is a difference between time t1 and time t2 occurs as illustrated in FIG. 3 until the coil temperature actually starts to increase.

While FIG. 3 illustrates the case where the control target value of the coil current is increased in steps, dead time occurs also when the control target value is decreased in steps similarly, too. The predetermined time tx described with reference to FIG. 2 needs to be set to a value greater than the dead time (particularly, the dead time for the case where the control target value of the coil current is decreased in steps).

Figure 4:
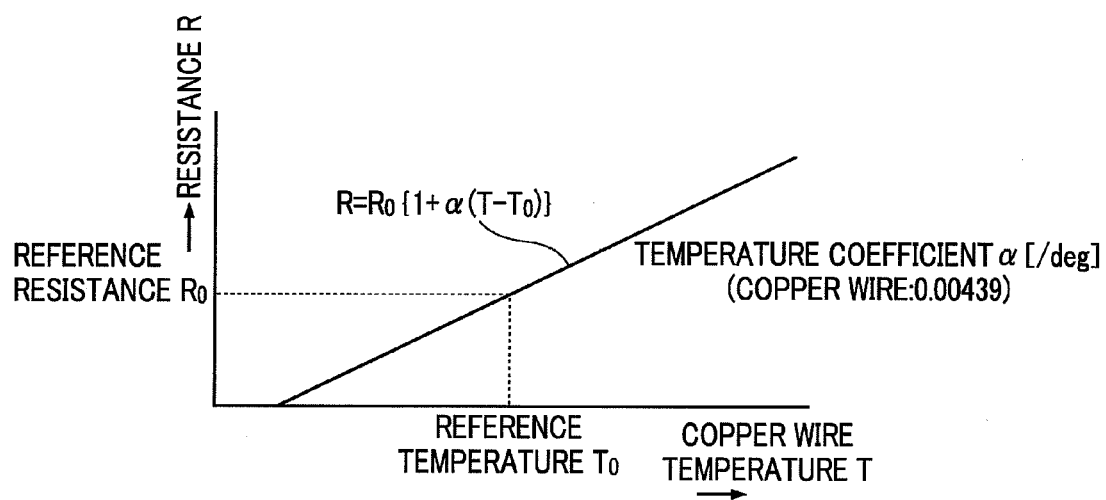
FIG. 4 is an explanatory diagram of a relationship between the coil temperature or coil current and a coil resistance value in a brushless DC motor.

FIG. 4 illustrates a relationship between the temperature T of a copper wire constituting the coil of the brushless DC motor 2 and a resistance value R thereof. Supposing that R0 is a reference resistance value of the coil, T0 is a reference temperature, and α is a temperature coefficient, the resistance value R at temperature T, is calculated by R=R0{1+α(T−T0)}.

The expressions described below (e11) to (e14) represent the calculation process of the upper limit value Ilimit in order. Although the brushless DC motor 2 has three phase coils, it is assumed in this example that the temperature environments for the phase coils are the same and these expressions are applied to any of the phase coils.

In the expression (e11) to the expression (e14), T, R, R0, and α are as defined in FIG. 4. T is the present coil temperature [° C.], R is a coil resistance value [Ω] at the present coil temperature T, R0 is a coil resistance [Ω] when the coil is at the reference temperature T0, and α is a temperature coefficient [/° C.] with respect to the coil resistance. Moreover, Tbody is a temperature [° C.] of the motor body on which the coil is mounted, Tlimit is the upper limit temperature [° C.] of the coil, W is a heat discharge rate [W (watt)] of the coil at the present coil temperature, h is a heat transfer coefficient [W/° C.], t is an elapsed time [second] from the present, Ilimit is an upper limit value [A (ampere)] of the coil, and C is a heat capacity [J (joule)/° C.] of the coil. Note that the heat discharge rate W is not static, but dynamic such that it increases along with an increase in the heat accumulation of the coil.

[EQUATION 1]

$$R = R_0\{1 + \alpha(T - 24)\} \quad \text{(e11)}$$

$$W = (T - T_{body})h \quad \text{(e12)}$$

$$I_{limit}^2 tR = (T_{limit} - T)C + Wt \quad \text{(e13)}$$

$$I_{limit} = \sqrt{\frac{(T_{limit} - T)C + Wt}{tR}} \quad \text{(e14)}$$

The present resistance value R of the coil is calculated from the expression (e11). Reference numeral 24 in the expression (e11) denotes a reference temperature T0 in FIG. 4 and represents 24° C. The heat discharge rate W is calculated from the expression (e12). The expression (e13) is used to calculate a remaining heat accumulation Ilimit2·t·R of the coil from the present until after the lapse of the predetermined time tx. The expression (e13) is an approximate expression and actually R and W dynamically vary from hour to hour for the predetermined time tx. In the coil temperature prediction calculation described later which is performed to calculate the upper limit value Ilimit, the expression (e13) may reflect the dynamic variation or may remain to be the approximate expression.

By solving the expression (e13) with respect to Ilimit, the expression (e14) is obtained. The upper limit current calculation unit 15 outputs Ilimit calculated from the expression (e14) to the vector processing unit 16.

Two sample concrete ways to determine the upper limit value Ilimit of the brushless DC motor 2 will be described below. The ways of detecting the upper limit value Ilimit of the brushless DC motor 2 are common to three phases, and therefore the description is made only for one phase.

First Example

A designer or a manufacturer performs experiments on the brushless DC motor 2 and then previously creates a characteristic graph as illustrated in FIG. 2 and stores the characteristic data in an upper limit value operation nonvolatile memory. As described above, FIG. 2 illustrates changes in coil temperature and coil current in the case of controlling coil current on the basis of the upper limit value Ilimit calculated by the upper limit current calculation unit 15. Therefore, if the upper limit current calculation unit 15 sets the upper limit value Ilimit of the coil current to the upper limit value of the characteristics illustrated in FIG. 2 for each coil temperature, the motor control device 1 is able to guarantee that the coil temperature T is equal to or lower than the upper limit temperature Tlimit after the lapse of the predetermined time tx.

In the characteristic graph of FIG. 2, the coil temperature T at starting the operation of the brushless DC motor 2 is set to 0° C., the upper limit temperature Tlimit of the coil is set to 100° C., and the predetermined time tx is set to 10 seconds. These values, however, are able to be appropriately changed. In the description below with respect to this calculation example, the upper limit value Ilimit of the coil current is calculated only from the present coil temperature on the basis of the characteristic graph data of FIG. 2. The characteristics of the coil temperature and the upper limit value Ilimit in the characteristic graph of FIG. 2, however, are associated with the set predetermined time tx and upper limit temperature Tlimit. Therefore, it is thought that, in this calculation example, the upper limit current calculation unit 15 calculates the upper limit value Ilimit on the basis of the present coil temperature, the upper limit temperature Tlimit, and the predetermined time tx.

In the calculation processing of the upper limit value Ilimit, the upper limit current calculation unit 15, first, detects the present coil temperature on the basis of detection signals from the temperature sensors 6u, 6v, and 6w, compares the detected present coil temperature with the coil temperature data in the upper limit value operation nonvolatile memory, and searches for coil temperature data associated with the present coil temperature. Then, the upper limit current calculation unit 15 further searches for coil current data associated with the coil temperature data in the upper limit value operation nonvolatile memory with respect to the coil temperature data found as a result of the search.

Subsequently, the upper limit current calculation unit 15 sets the coil current related to the coil current data found as a result of the search to the upper limit value Ilimit. The coil temperature of the characteristic data stored in the upper limit value operation nonvolatile memory is a discrete value and therefore, in some cases, does not completely coincide with the coil temperature detected based on the detection signals of the temperature sensors 6u, 6v, and 6w. In such a case, the upper limit current calculation unit 15 calculates the upper limit value Ilimit corresponding to the present coil temperature by using the interpolating method.

In the first example, the calculation of the upper limit value Ilimit is simplified, thereby reducing the time required for the calculation. Although the simplified calculation decreases the calculation accuracy, the decrease in the calculation accuracy is able to be compensated by reducing the predetermined time ty to decrease the update interval of the upper limit value Ilimit. Therefore, the coil temperature T from the present until after the lapse of the predetermined time tx does not exceed the upper limit temperature Tlimit of the coil.

Second Example

The upper limit current calculation unit 15 calculates the upper limit value Ilimit by a predetermined simulation. The upper limit current calculation unit 15, first, sets the present coil current to a provisional upper limit value It to predict how the coil temperature changes according to the provisional upper limit value It every time a certain time $\Delta t$ ($\Delta t$<predetermined time tx) elapses from the present and to obtain the coil temperature after the lapse of the predetermined time tx as a predicted coil temperature. The certain time $\Delta t$ is a time division which is used to calculate the predicted coil temperature when the upper limit value Ilimit is calculated and is different from the aforementioned predetermined time ty.

To be more specific, the upper limit current calculation unit 15 calculates the coil temperature after the lapse of the certain time $\Delta t$ by using the expressions (e11) to (e13). The upper limit current calculation unit 15 obtains R and W from the expressions (e11) and (e12) by substituting a coil temperature (the present coil temperature in the first time) at the start of the certain time $\Delta t$ for T as a first step. In addition, Tbody is assumed to be unchanged during the predetermined time tx.

As a second step, the upper limit current calculation unit 15 solves for an unknown x by substituting the provisional upper limit value It for Ilimit and substituting R and W obtained from the expressions (e11) and (e12) into the expression (e13) where Tlimit of the expression (e13) is x of the coil temperature (an unknown) at the end of the certain time $\Delta t$. The upper limit current calculation unit 15 repeats the first and second steps with the solution of x as the coil temperature at the start of the certain time $\Delta t$.

As described above, the upper limit current calculation unit 15 obtains the coil temperatures in order every time the certain time $\Delta t$ elapses from the present and then checks whether the predicted coil temperature as the coil temperature at the time when the integrated amount of the time $\Delta t$ reaches the predetermined time tx exceeds the upper limit temperature Tlimit. If the predicted coil temperature exceeds the upper limit temperature, the upper limit current calculation unit 15 needs to set the upper limit value of the coil current, in which the coil temperature is to be remained at the upper limit temperature or lower after the lapse of the predetermined time tx, to a lower value than the present provisional upper limit value It. Accordingly, the upper limit current calculation unit 15 updates the provisional upper limit value It to a value $\Delta I$ which is lower by a predetermined amount (It−$\Delta I$→It) and repeats the calculation processing for obtaining the predicted coil temperature after the lapse of the predetermined time tx from the present with the coil temperature as the present coil temperature for the provisional upper limit value It after the update.

The upper limit current calculation unit 15 sets the upper limit value Ilimit to the provisional upper limit value It in the predicted coil temperature calculation processing obtained when the predicted coil temperature comes to a value equal to or lower than the upper limit temperature for the first time in the repeated predicted coil temperature calculation processing.

Figure 5:
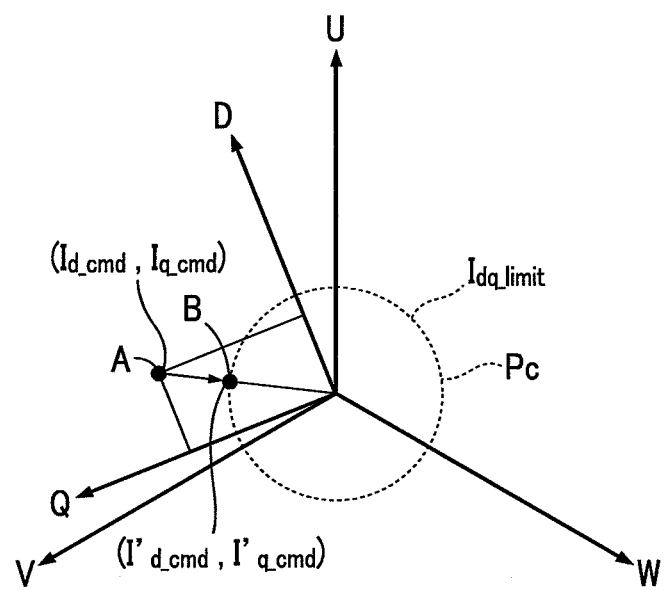
FIG. 5 is an explanatory diagram of processing of a vector processing unit for the upper limit value calculated by the upper limit current calculation unit.

FIG. 5 is a diagram describing processing of the vector processing unit 16 for the upper limit value calculated by the upper limit current calculation unit 15. The vector processing unit 16 performs a predetermined vector operation in the d-q coordinate system. While U, V, and W axes corresponding to the U, V, and W phases are illustrated in FIG. 5, the angular intervals around the origin of the U, V, and W axes are each 120° in electric angle. In FIG. 5, the D and Q axes do not coincide with any of the U, V, and W axes, but the relative angle between the D and Q axes and the U, V, and W axes is able to be arbitrarily set.

In the processing of FIG. 5, it is assumed that the respective phase coils of the brushless DC motor 2 are placed in the same state at an arbitrary time. Therefore, one arbitrary phase coil is selected out of the three phase coils of the brushless DC motor 2 and the operations of other phase coils are omitted. In the processing of FIG. 5, the V-phase coil is selected.

Previous to the description with reference to FIG. 5, the following expressions (e21) to (e24) will be described below. The expression (e21) and the expression (e22) are used by the upper limit current calculation unit 15 and the expression (e23) and the expression (e24) are used by the vector processing unit 16. In these expressions, it is assumed that the phase coils of the brushless DC motor 2 change with the same state maintained with respect to the temperature environment. Therefore, the values calculated only with respect to the V phase from these expressions are also applicable to other phases. The suffix V appended to a symbol in these expressions denotes that the symbol is of the V phase.

[EQUATION 2]

$$I_{vr\_limit} = \sqrt{\frac{(T_{limit} - T_v)C + W_v t}{tR}} \quad (e21)$$

$$I_{r\_limit} = I_{vr\_limit} \quad (e22)$$

$$I_{dq\_limit} = \sqrt{3}\, I_{r\_limit} \quad (e23)$$

If $|(I_{d\_cmd}, I_{q\_cmd})| > I_{dq\_limit}$ then  (e24)

$$(I'_{d\_cmd}, I'_{q\_cmd}) = (I_{d\_cmd}, I_{q\_cmd}) \frac{I_{dq\_limit}}{|(I_{d\_cmd}, I_{q\_cmd})|}$$

The expression (e21) is obtained by applying the aforementioned expression (e14) with respect to the V phase. In the expression (e22), the V-phase upper limit value calculated by the expression (e21) is substituted to the upper limit value Ir_limit. The upper limit value Ir_limit is also used for expressions (e34) and (e35) described later and is mere a variable which is set for program generalization. In the expression (e23), Idq_limit is calculated by multiplying Ir_limit by √3 to perform processing in the d-q coordinate system. The expression (e24) is described later.

The vector processing unit 16 receives information on the target rotational speed and the target torque of the brushless DC motor 2 from the torque-speed control unit 12. The target vector A rotates around the origin at a rotational speed corresponding to the target rotational speed of the brushless DC motor 2 with the origin of the d-q coordinate system as a base point. The relationship between the target rotational speed of the brushless DC motor 2 and the rotational speed of the target vector A in the d-q coordinate system relates to a pole number of the brushless DC motor 2. As the pole number of the brushless DC motor 2 increases relative to the same target rotational speed of the brushless DC motor 2, the rotational speed of the target vector in the d-q coordinate system increases. The length of the target vector A corresponds to the target torque.

In FIG. 5, a circle Pc is set. The circle Pc has a center at the origin and has a radius of Idq_limit. The circle Pc defines the upper limit value of the coil current. When the position of the tip of the target vector A is contained in the inside of the circle Pc, in other words, |(Id_cmd, Iq_cmd)|≤Idq_limit is satisfied, the following equation is satisfied: the correction vector B (I'd_cmd, I'q_cmd)=the target vector A (Id_cmd, Iq_cmd).

In contrast, when the position of the tip of the target vector A is outside the circle Pc, in other words, |(Id_cmd, Iq_cmd)|>Idq_limit is satisfied, the target vector A is corrected to the correction vector B. The correction vector B (I'd_cmd, I'q_cmd) is obtained by changing only the length to Idq_limit while maintaining the direction of the target vector. The expression (e24) is a calculation expression for the correction vector B when |(Id_cmd, Iq_cmd)|>Idq_limit is satisfied.

The vector processing unit 16 outputs the information on the correction vector B to the phase current converter unit 17. The phase current converter unit 17 calculates the U-, V-, and W-phase currents corresponding to the correction vector B at each time point and outputs the information on the phase currents to the inverter 3 and the upper limit current calculation unit 15. The U-, V-, and W-phase currents deviate from each other by 120° in phase and the total sum of phase currents at each time point is zero and therefore the magnitude of the phase current and the phase at each time point of the U, V, and W phases are uniquely determined from the correction vector B at each time point.

In this manner, each phase current from the inverter 3 to the brushless DC motor 2 is equal to or lower than the upper limit value calculated by the upper limit current calculation unit 15. As a result, the temperature of the each phase coil of the brushless DC motor 2 remains at a value equal to or lower than the upper limit temperature Tlimit at the time point after the lapse of the predetermined time tx from the present.

In this example, the length of the correction vector B corresponds to an effective value of the phase current. Therefore, when the phase current at each time point is calculated, the effective value (the length of the correction vector B) is multiplied by √2, the obtained value is converted to an amplitude (crest value), and then the amplitude is multiplied by a coefficient related to the phase to calculate each phase current.

Figure 6:
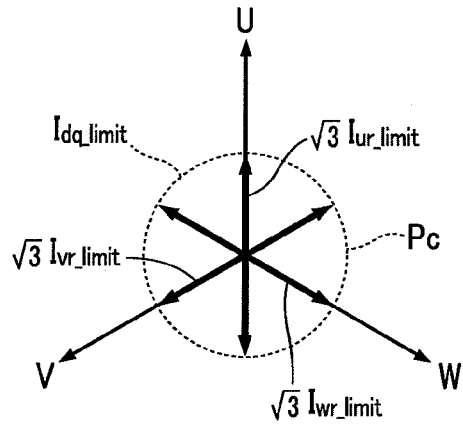
FIGS. 6(a), 6(b), and 6(c) are diagrams illustrating a calculation method of a correction vector in the d-q coordinate system by the vector processing unit in a state where the status of use varies with each phase coil.
Figure 6:
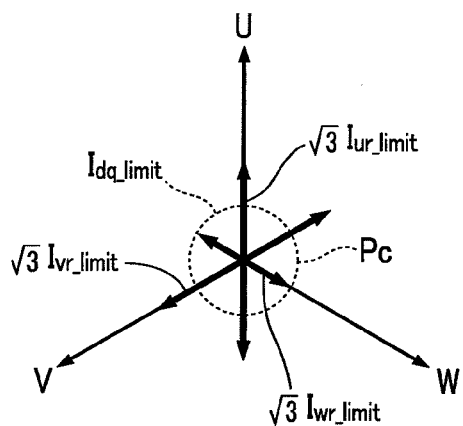
Figure 6:
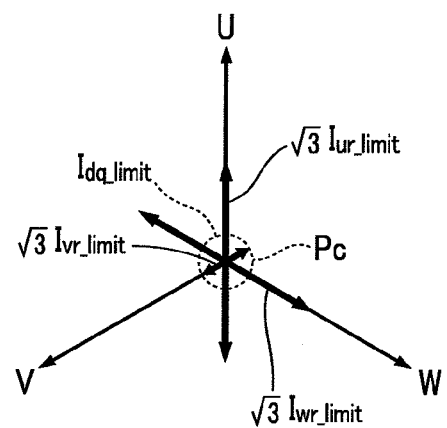

FIG. 6 illustrates a calculation method of a correction vector by the vector processing unit 16 in the case where the status of the temperature may vary among the phases. Previous to the description with reference to FIG. 6, the following expressions (e31) to (e36) will be described below.

[EQUATION 3]

$$I_{ur\_limit} = \sqrt{\frac{(T_{limit} - T_u)C + W_u t}{tR_u}} \quad (e31)$$

$$I_{vr\_limit} = \sqrt{\frac{(T_{limit} - T_v)C + W_v t}{tR_v}} \quad (e32)$$

$$I_{wr\_limit} = \sqrt{\frac{(T_{limit} - T_w)C + W_w t}{tR_w}} \quad (e33)$$

-continued $$I_{r\_limit} = \min(I_{ur\_limit}, I_{vr\_limit}, I_{wr\_limit}) \quad (e34)$$

$$I_{dq\_limit} = \sqrt{3}\, I_{r\_limit} \quad (e35)$$

If $|(I_{d\_cmd}, I_{q\_cmd})| > I_{dq\_limit}$ then (e36)

$$(I'_{d\_cmd}, I'_{q\_cmd}) = (I_{d\_cmd}, I_{q\_cmd}) \frac{I_{dq\_limit}}{|(I_{d\_cmd}, I_{q\_cmd})|}$$

The expressions (e31) to (e33) correspond to the aforementioned expression (e21). In the expression (e21), the calculation has been made only with respect to the V phase as a typical example among three phases since the status of use of the phases is the same. In the expressions (e31) to (e33), however, the upper limit values Iur_limit, Ivr_limit, and Iwr_limit are calculated with respect to the U, V, and W phases, respectively. In the expressions (e31) to (e34), suffixes U, V, and W represent that the symbols with the suffixes appended thereto are of the U, V, and W phases, respectively.

The expressions (e34) and (e35) correspond to the aforementioned expressions (e22) and (e23). In the expression (e34), the minimum upper limit value is selected as Ir_limit out of the upper limit values Iur_limit, Ivr_limit, and Iwr_limit. In the expression (e35), processing is made in the d-q coordinate system, and therefore Ir_limit is multiplied by √3 to calculate Idq_limit. In this manner, the calculated value Idq_limit has the magnitude corresponding to the minimum value among the upper limit values Iur_limit, Ivr_limit, and Iwr_limit.

Returning to FIG. 6, the circle Pc is set so as to be associated with the minimum one among the upper limit values Ivr_limit, Ivr_limit, and Iwr_limit in FIG. 6(a) to FIG. 6(c). The circle Pc has the center as the origin of the d-q coordinate system and has a radius of a value obtained by multiplying the minimum one among the upper limit values Ivr_limit, Ivr_limit, and Iwr_limit by √3.

In FIG. 6(a), the equation Iur_limit=Ivr_limit=Iwr_limit=Idq_limit/√3 is satisfied. In FIG. 6(b), the minimum value among three upper limit values Iur_limit, Ivr_limit, and Iwr_limit is Iwr_limit and therefore Iwr_limit=I dq_limit/√3 is satisfied. In FIG. 6(c), the minimum value among three upper limit values Iur_limit, Ivr_limit, and Iwr_limit is Ivr_limit and therefore Ivr_limit=I dq_limit/√3 is satisfied.

The expression (e36) is a calculation expression for the length of the correction vector B. The length of the target vector A is obtained from the d-q coordinates of the position of the tip of the target vector A. If |(Id_cmd, Iq_cmd)|>Idq_limit, in other words, |A|>|B|, then the correction vector B is changed in such a way that the direction is not changed, but the length is reduced to the radius of the circle Pc (B=(A/|A|)·Idq_limit) If |(Id_cmd, Iq_cmd)|≤Idq_limit, A=B is satisfied.

The vector processing unit 16 outputs the information on the correction vector B obtained from the processing related to FIG. 6 to the phase current converter unit 17. The phase current converter unit 17 calculates the U-, V-, and W-phase currents from the correction vector B at each time point and then outputs the information on the phase currents to the inverter 3 and the upper limit current calculation unit 15.

As a result of setting the circle Pc set in the d-q coordinate system so as to be associated with the minimum one of the upper limit values Iur_limit, Ivr_limit, and Iwr_limit, all of the U-, V-, and W-phase currents calculated by the phase current converter unit 17 by converting the correction vector B are equal to or lower than the upper limit values Iur_limit, Ivr_limit, and Iwr_limit, respectively. Thereby, all of the coil temperatures of the phase coils are prevented from exceeding Tlimit after the lapse of the predetermined time tx.

Figure 7:
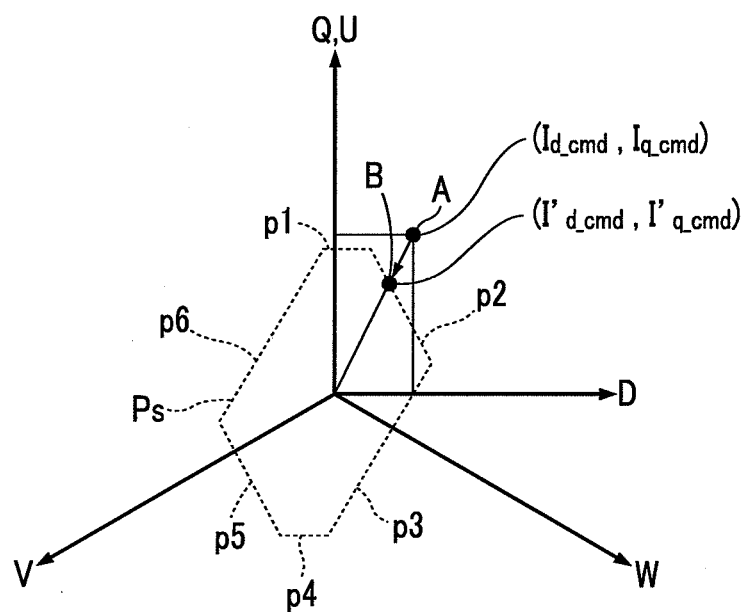
FIG. 7 is a diagram illustrating another calculation method of a correction vector in the d-q coordinate system by the vector processing unit in a state where the status of use varies with each phase coil.

FIG. 7 illustrates another calculation method of a correction vector by the vector processing unit 16 in the case where the status of use varies with each phase coil. Although the circle Pc is used in the d-q coordinate system in the calculation method of FIG. 6, a polygon Ps is used in the calculation method of FIG. 7. In addition, although the Q axis of the d-q coordinate system coincides with the U axis in FIG. 7, relative angles between the D and Q axes and the U, V, and W axes are able to be arbitrarily set.

Figure 8:
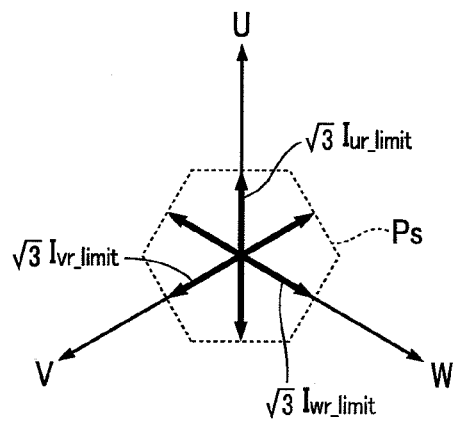
FIGS. 8(a), 8(b), and 8(c) are diagrams illustrating various polygons in the d-q coordinate system determined according to the correlation between the upper limit values of coil currents of the respective phases.
Figure 8:
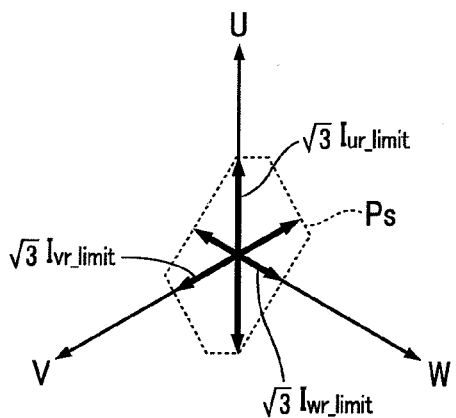
Figure 8:
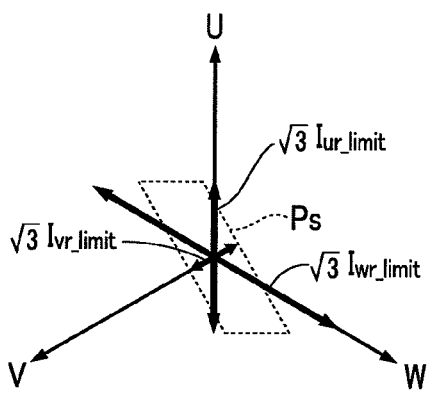

The polygon Ps is a hexagon or a quadrangle as described later with reference to FIG. 8. In FIG. 8, Polygon Ps is formed of six sides p1 to p6. The opposite sides (p1, p4), (p2, p5), and (p3, p6) are parallel to each other. In addition, (p1, p4), (p2, p5), and (p3, p6) are at right angle to the U, V, and W axes, respectively.

The distances between the opposite sides (p1, p4), the opposite sides (p2, p5), and the opposite sides (p3, p6) are typically values obtained by multiplying the values Iur_limit, Ivr_limit, and Iwr_limit, which have been calculated by the expressions (e31), (e32), and (e33), respectively, by √2(=2/√2). The distances, however, may be increased up to double the upper limit values Iur_limit, Ivr_limit, and Iwr_limit, respectively. The reason why the values Iur_limit, Ivr_limit, and Iwr_limit are multiplied by √2 is the same as the reason why k in FIG. 9 described later is set to 1/√2 (√2 is equal to the double of 1/√2) during stop of rotation of the brushless DC motor 2. More specifically, the setting of the polygon Ps is originally intended to deal with the processing during stop of rotation of the brushless DC motor 2.

(Id_cmd, Iq_cmd) and (I'd_cmd, I'q_cmd) in FIG. 7 denote the d-q coordinates of the positions of the tips of the target vector A and the correction vector B, respectively, similarly to the case of (Id_cmd, Iq_cmd) and (I'd_cmd, I'q_cmd) in FIG. 5.

The polygon Ps defines the upper limit value of the coil current. When the target vector A is located outside the polygon Ps, in other words, if |A|>|B|, the target vector A is corrected to the correction vector B whose tip is located on a side of the polygon Ps. If |A|≤|B|, the target vector A is directly used as the correction vector B. The aforementioned correction formula (e36) from the target vector A to the correction vector B with respect to the circle Pc is directly applicable to the polygon Ps, too.

Also when the polygon Ps is used, the vector processing unit 16 outputs the information on the correction vector B to the phase current converter unit 17 in the same manner as for using the circle Pc. The phase current converter unit 17 calculates the U-, V-, and W-phase currents corresponding to the correction vector B at each time point and then outputs the information on the phase currents to the inverter 3 and the upper limit current calculation unit 15. The U-, V-, and W-phase currents deviate from each other by 120° in phase and the total sum of the phase currents at each time point is zero and therefore the magnitude of the phase current and the phase at the each time point of the U, V, and W phases are uniquely determined from the correction vector B at each time point.

The length of the correction vector B corresponds to the effective value of the phase current. Therefore, when the phase current at each time point is calculated, the magnitude of the phase current at each time point is determined on the basis of the amplitude (crest value) which is obtained by multiplying the effective value by √2.

FIG. 8 illustrates various polygons which are determined according to the correlation between the upper limit values of the respective phases. In the case of FIG. 8(a), the d-q coordinates Iur_limit, Ivr_limit, and Iwr_limit of the U, V, and W phases are equal to each other. In this case, the polygon Ps is a regular hexagon.

In the case of FIG. 8(b), the d-q coordinates Iur_limit, Ivr_limit, and Iwr_limit of the U, V, and W phases have a relationship satisfying the conditions: Iur_limit>Ivr_limit>Iwr_limit, and Iwr_limit·sin 60°≤Ivr_limit+Iur_limit·tan 30°. In this case, the polygon Ps is a hexagon satisfying the condition: the width in the U-axis direction>the width in the V-axis direction>the width in the W-axis direction.

In the case of FIG. 8(c), the d-q coordinates Iur_limit, Ivr_limit, and Iwr_limit of the U, V, and W phases have a relationship satisfying the conditions: Iwr_limit>Iur_limit>Ivr_limit and Iwr_limit·sin 60°>Ivr_limit+Iur_limit·tan 30°. In this case, the polygon Ps is a parallelogram satisfying the condition: the width in the U-axis direction>the width in the V-axis direction.

In the current limiting scheme with the circle Pc in FIG. 5 and FIG. 6, the upper limit value of the coil current is set to the minimum among the three-phase upper limit values without exception independently of the difference in phase. On the other hand, in the current control scheme with the polygon Ps in FIG. 7 and FIG. 8, the upper limit value is able to be set to a relatively great value in a phase having a margin of temperature rise in comparison with a phase having no margin of temperature rise. As a result, the output torque of the brushless DC motor 2 is improved.

Moreover, in the motor, rotation with less variation is required during high-speed rotation and rotation with high-output torque is required during low-speed rotation. The motor control device 1 is also able to select the current limiting scheme with the circle Pc in FIG. 5 and FIG. 6 during high-speed rotation and to select the current control scheme with the polygon Ps in FIG. 7 and FIG. 8 during low-speed rotation.

Figure 9:
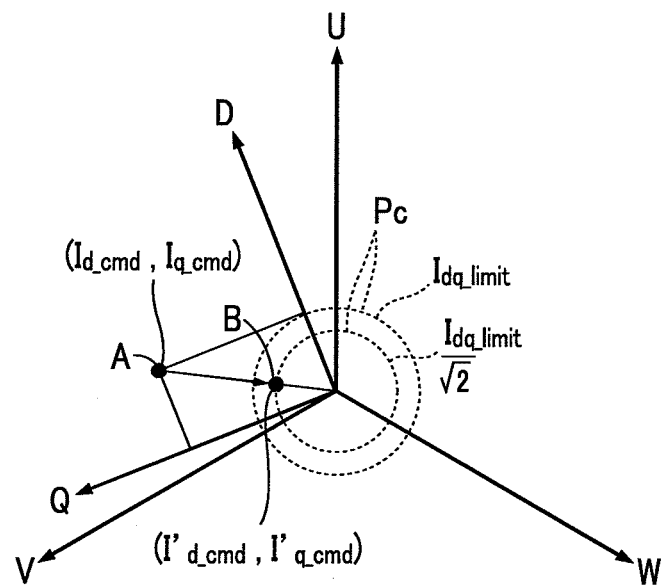
FIGS. 9(a) and 9(b) are diagrams illustrating changes in a circle in the d-q coordinate system in the case of changing the upper limit value of the coil current according to the rotational speed of the brushless DC motor.
Figure 9:
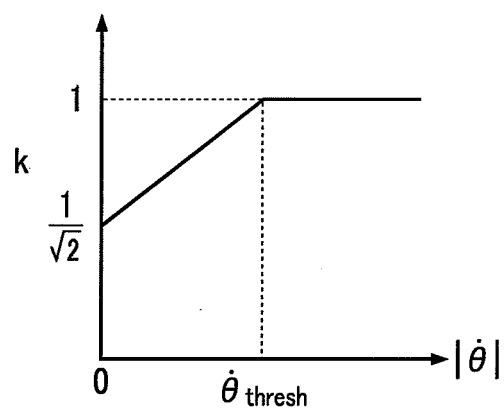

FIG. 9 illustrates a change in the circle Pc in the d-q coordinate system in the case of varying the upper limit value according to the rotational speed of the brushless DC motor 2. In FIG. 9, the radius of the circle Pc is set to a value obtained by multiplying the radius of the circle Pc in FIG. 5 by a coefficient k.

FIG. 9(a) illustrates a contrast between the circle Pc in the case where the coefficient k is 1 with respect to the circle Pc having the standard radius and the circle Pc in the case where k is 1/(√2). FIG. 9(b) illustrates a relationship between the absolute value of the derivative value of an electric angle θ (the derivative value is represented by a dot at the top of θ. In the specification, the dot is appended to the right-hand side of θ like "θ·") and the coefficient k.

Calculation expressions for a case where the method of FIG. 9 is used are the following expressions (e41) to (e47). The expressions (e41) to (e43) are used instead of the expressions (e31) to (e33), respectively. The reference character k in the expressions (e41) to (e43) is calculated from the expression (e44) complying with the graph of FIG. 9(b). The expressions (e45) to (e47) are the same as the expressions (e34) to (e36).

[EQUATION 4]

$$I_{ur\_limit} = k\sqrt{\frac{(T_{limit} - T_u)C + W_u t}{tR_u}} \quad (e41)$$

$$I_{vr\_limit} = k\sqrt{\frac{(T_{limit} - T_v)C + W_v t}{tR_v}} \quad (e42)$$

$$I_{wr\_limit} = k\sqrt{\frac{(T_{limit} - T_w)C + W_w t}{tR_w}} \quad (e43)$$

$$\left. \begin{array}{l} \text{if } (|\dot{\theta}| < |\dot{\theta}|_{thresh}) \\ k = \left( \frac{1 - 1/\sqrt{2}}{|\dot{\theta}|_{thresh}} |\dot{\theta}| + \frac{1}{\sqrt{2}} \right) \\ \text{else} \\ k = 1 \end{array} \right\} \quad (e44)$$

$$I_{r\_limit} = \min(I_{u\_limit}, I_{v\_limit}, I_{w\_limit}) \quad (e45)$$

$$I_{dq\_limit} = \sqrt{3}\, I_{r\_limit} \quad (e46)$$

If $|(I_{d\_cmd}, I_{q\_cmd})| > I_{dq\_limit}$ then (e47)

$$(I'_{d\_cmd}, I'_{q\_cmd}) = (I_{d\_cmd}, I_{q\_cmd}) \frac{I_{dq\_limit}}{|(I_{d\_cmd}, I_{q\_cmd})|}$$

In the case of using the method in FIG. 9, k gradually decreases to 1/(√2) during speed reduction in which the brushless DC motor 2 is going to stop particularly under the condition |θ·|<θthresh|, and therefore the brushless DC motor 2 stops the rotation slowly.

The upper limit value of the phase coil is set so as to satisfy the condition: the coil temperature after the lapse of the predetermined time tx≤Tlimit, where k=1. Therefore, the temperature of the phase coil naturally satisfies the condition, the coil temperature after the lapse of the predetermined time tx≤Tlimit, in the range of 1/√2≤k<1.

Although the description has been made hereinabove with respect to the motor control device 1 which controls the coil temperature so as not to exceed the guaranteed upper limit temperature in the brushless DC motor 2, namely a three-phase motor, the motor control device according to the present invention is also applicable to a single-phase AC motor and to a brush-type DC motor as long as the motor includes a motor coil. With respect to a motor control device applied to a single-phase motor (induction motor), in the motor control device 1 in FIG. 1, only elements and processing units related to the coil temperature control of one of three phases, U, V, and W phases may be retained while elements related to the coil temperature control of other two phases are omitted.

For example, in the expressions (e11) to (e14) of the aforementioned [EQUATION 1], the upper limit value Ilimit is calculated only for the V phase considering that the temperature environment is the same with respect to the phase coils of all phases of the brushless DC motor 2. In the case where the motor control device of the present invention is applied to a single-phase AC motor and to a brush-type DC motor, however, the control processing is able to be performed considering that only V phase exists in the brushless DC motor 2.

Describing the case of applying the motor control device of the present invention to the single-phase AC motor, first, the upper limit current calculation unit 15 as an upper limit current determination means replaces the respective parameters of the V phase by single-phase AC parameters of the single-phase AC motor and then calculates the upper limit value Ilimit of the single-phase AC motor. The upper limit value Ilimit of the single-phase AC motor calculated by the upper limit current calculation unit 15 is output to a coil current control means (the coil current control means does not include an element corresponding to the vector processing unit 16) which corrects the current which is input to the single-phase AC motor and the coil current control means limits the single-phase AC coil current to be supplied to the single-phase AC motor to a value equal to or lower than the upper limit value.

Moreover, it is also possible to use the vector processing unit 16 directly for the motor control device of the single-phase AC motor. In that case, the vector processing unit 16 included as one element in the coil current control means calculates the target vector A as described with reference to FIG. 5 similarly to the case of the brushless DC motor 2 and then generates the correction vector B limited to a value equal to or lower than the upper limit value Ilimit of the single-phase AC motor from the target vector A. The phase current converter unit 17 applies, for example, the V phase to a single phase of the single-phase AC motor to consider the single-phase coil current of the single-phase AC motor as a V-phase coil current and calculates the coil current of the single-phase AC motor from the correction vector B.

In the case of applying the motor control device of the present invention to the brush-type DC motor, the coil current control means controls the DC feed current of the DC motor so as to be equal to or lower than the upper limit value Ilimit with respect to the upper limit value Ilimit obtained from the aforementioned expression (e14) by the upper limit current determination means. Specifically, if the target feed current of the DC motor is greater than the upper limit value Ilimit, DC current obtained by correcting DC current so as to be equal to or lower than the upper limit value Ilimit is supplied to the DC motor.

Figure 10:
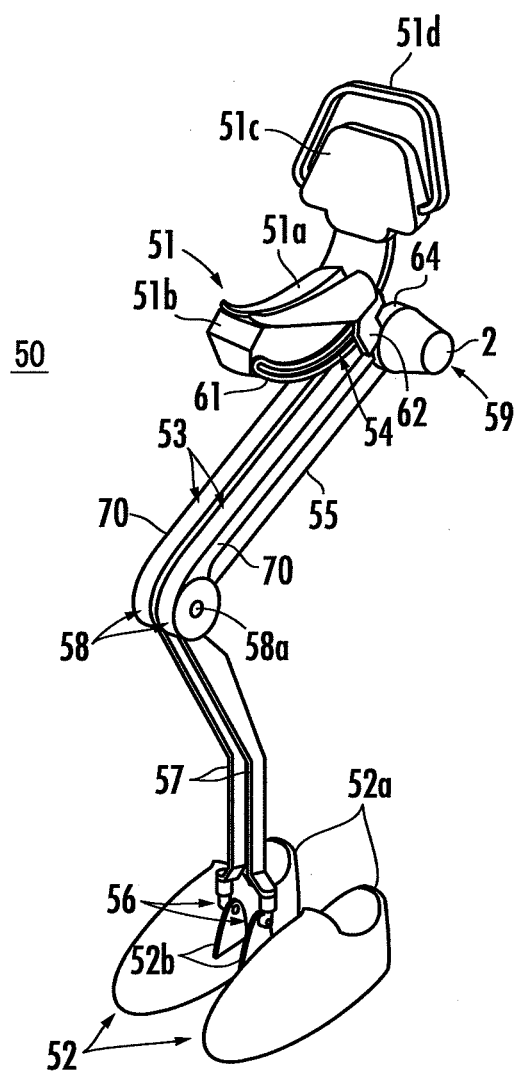
FIG. 10 is a perspective view of a walking assist device equipped with the motor control device.
Figure 11:
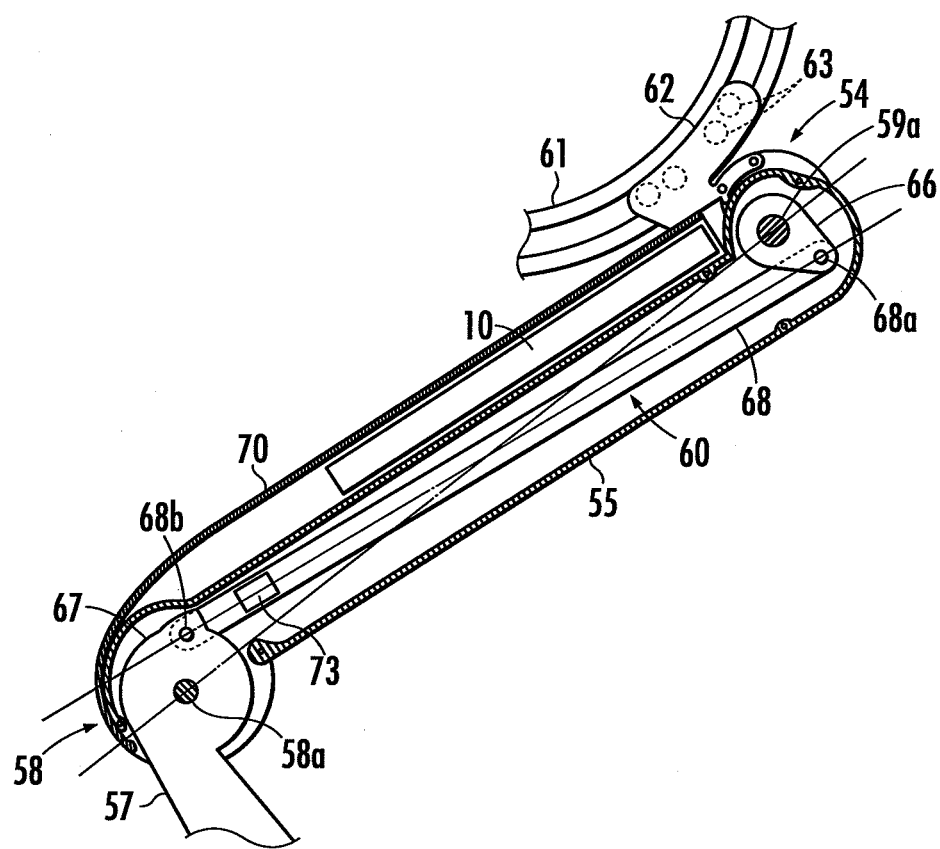
FIG. 11 is a cross-sectional side view of a thigh frame equipped with a motor and a battery in the walking assist device of FIG. 10.

FIGS. 10 and 11 are configuration diagrams of a walking assist device 50 equipped with the motor control device 1. The brushless DC motor 2 in FIG. 1 is provided as a drive source in an actuator 59 which adjusts the flexion angle of a third joint (knee joint) 58 of a leg link 53. In addition, the battery 10 in FIG. 1 is provided in a thigh frame 55, as a power supply of all electric devices provided in the walking assist device 50 which includes the brushless DC motor 2 and the motor control device 1 (FIG. 11).

In FIG. 10, the walking assist device 50 includes a seat member 51 as a lifting force transmitting portion, a pair of left and right foot attachment portions 52 and 52 fitted to the feet of the legs of a user, and a pair of left and right leg links 53 and 53 connecting the foot attachment portions 52 and 52 to the seat member 51. The left and right foot attachment portions 52 and 52 have the same structure and are symmetrical with each other. The left and right leg links 53 and 53 have the same structure and are symmetrical with each other, too.

The leg link 53 includes a thigh frame 55 extending downward from the seat member 51 via a first joint 54, a crus frame 57 extending upward from the foot attachment portion 52 via a second joint 56, and a third joint 58 which is located between the first joint 54 and the second joint 56 to interconnect the thigh frame 55 and the crus frame 57 so that the frames freely bend and stretch.

Further, the walking assist device 50 has an actuator 59 which generates a driving force for driving the third joint 58 and a power transmission system 60 which transmits the driving force of the actuator 59 to the third joint 58 to apply a driving torque around a joint axis of the third joint 58 thereto for each leg link 53.

The seat member 51 includes a saddle-shaped seat 51a on which the user is seated in a straddling manner (in a manner that the seat member 51 is positioned between the root ends of the legs of the user), a supporting frame 51b attached to the undersurface of the seat 51a, and a hip cushion 51c mounted at the rear end (a raised portion which is raised upward at the back side of the seat 51a) of the supporting frame 51b. Additionally, the hip cushion 51c is provided with an arched gripper 51d that allows the user or an attendant to grip.

Although the lifting force transmitting portion is formed by the seat member 51 with the saddle-shaped seat 51a in this embodiment, it is possible to use, for example, a harness-shaped flexible member (for example, FIG. 16 in Japanese Patent Application Laid-Open No. 2007-54616), instead. Preferably, the lifting force transmitting portion has a part in contact with the user between the root ends of the legs in order to apply an upward lifting force to the trunk of the user.

The first joint 54 of each leg link 53 has two degrees of freedom of rotation (two degrees of freedom) around two joint axes in the anteroposterior direction and in the horizontal direction. More specifically, the first joint 54 has an arc-shaped guide rail 61 connected to the seat member 51. The guide rail 61 is movably engaged with a slider 62 fixed to the top end of the thigh frame 55 of each leg link 53 via a plurality of rollers 63 rotatably attached to the slider 62. This enables the leg link 53 to make a swing motion in the anteroposterior direction (back and forth rocking motion) around a first joint axis of the first joint 54, where the first joint axis is a horizontal axis passing through the center of curvature of the guide rail 61 (more specifically, an axis in a direction perpendicular to the plane including the arc of the guide rail 61).

Moreover, the guide rail 61 is pivotally supported at the rear end (raised portion) of the supporting frame 51b of the seat member 51 via a spindle (not illustrated) whose central axis is oriented in the anteroposterior direction so as to be swingable around the central axis of the spindle 54b. This enables each leg link 53 to perform a swing motion in the horizontal direction around a second joint axis of the first joint 54, namely, an adduction and abduction motion, where the second joint axis is the central axis of the spindle 54b. In this embodiment, the second joint axis of the first joint 54 (only the left first joint 54 is illustrated in FIG. 10) is a common joint axis between the left first joint 54 and the right first joint 54.

As described above, the first joint 54 is adapted to allow each leg links 53 to perform swing motions around two joint axes in the anteroposterior direction and in the horizontal direction.

Each foot attachment portion 52 includes a shoe 52a fitted to the corresponding foot of the user and a connecting member 52b projecting upwardly from the inside of the shoe 52a. The foot attachment portion 52 is in contact with the ground via the shoe 52a in a state where the leg of the user is standing (supporting leg). The connecting member 52b is connected to the bottom end of the crus frame 57 of the leg link 53 via the second joint 56.

The third joint 58 has a degree of freedom of rotation around one axis in the horizontal direction. The third joint 58 has a spindle 58a which pivotally supports the top end of the crus frame 57 at the bottom end of the thigh frame 55. The central axis of the spindle 58a is substantially parallel to the first joint axis (an axis perpendicular to the plane including the arc of the guide rail 61) of the first joint 54. The central axis of the spindle 58a serves as the joint axis of the third joint 58. The crus frame 57 is rotatable relative to the thigh frame 55 around the joint axis. This enables the bending and stretching motion of the leg link 53 at the third joint 58.

The actuator 59 provided in each leg link 53 is a rotary actuator formed by a brushless DC motor 2 with a reduction gear 64. The rotary actuator 59 is mounted on the outer surface of the top end (a portion near the first joint 54) of the thigh frame 55 so that the central axis of an output shaft 59a is parallel to the joint axis of the third joint 58 (the central axis of the spindle 58a). A housing (a portion fixed to a stator of the brushless DC motor 2) of the rotary actuator 59 is provided in a fixed manner on the thigh frame 55.

Mainly in FIG. 11, each power transmission system 60 includes a driving crank arm 66 fixed coaxially with the output shaft 59a of the rotary actuator 59, a driven crank arm 67 fixed to the crus frame 57 coaxially with the joint axis of the third joint 58, and a connecting rod 68 pivotally attached to the driving crank arm 66 and to the driven crank arm 67 at one end and the other end, respectively. The connecting rod 68 linearly extends between a pivotally attached portion 68a to the driving crank arm 66 and a pivotally attached portion 68b to the driven crank arm 67.

The driving force (output torque) output from the output shaft 59a of the rotary actuator 59 by the operation of the brushless DC motor 2 is converted to a translational force in the longitudinal direction of the connecting rod 68 from the output shaft 59a via the driving crank arm 66. Then, the translational force (rod transmitting force) is transmitted through the connecting rod 68 in the longitudinal direction thereof. Further, the translational force is converted to a driving torque from the connecting rod 68 via the driven crank arm 67. Then, the driving torque is applied to the third joint 58 as a driving force for bending and stretching the leg link 53 around the joint axis of the third joint 58.

The total sum of the lengths of the thigh frame 55 and the crus frame 57 of each leg link 53 is greater than the length of the leg of the user in a state where the leg is linearly extending. Therefore, the leg links 53 are always flexed at the third joints 58. The flexion angle ranges, for example, from approx. 40° to 70° during normal walking of the user on flat ground.

The battery 10 is placed between the connecting rod 68 and the guide rail 61 in the thigh frame 55. A cover 70 is attached to the thigh frame 55 to cover the battery 10. The battery 10 supplies power to all electric components provided in the walking assist device 50.

As described above, the rotational power of the brushless DC motor 2 of the rotary actuator 59 is used to adjust the flexion angle of the third joint 58 as a knee joint via the power transmission system 60. While the third joint 58 needs the rotational power of the brushless DC motor 2 to rotate when changing the flexion angle, the third joint 58 also needs to output a predetermined torque in order to support the weight or the like of the user when the flexion angle is maintained constant. Therefore, the brushless DC motor 2 needs to be supplied with power from the battery 10 on a steady basis, independently of whether the third joint 58 is moving or in a stopped state, during a period in which the user is seated on the seat member 51 and the weight is applied to the third joint 58.

The phase current needed for each phase coil of the brushless DC motor 2 relates to the flexion angle during rest of the third joint 58. Therefore, the phase current frequently becomes imbalanced among the three phases according to the flexion angle during rest of the third joint 58. In addition, in the walking assist device 50, the user frequently repeats standing and walking. Therefore, the rotational speed of the brushless DC motor 2 varies over a wide range from a low speed to a high speed, though the reduction gear 64 is provided between the brushless DC motor 2 and the output shaft 59a.

The motor control device 1 calculates the upper limit of the coil current of each phase as described above for the usage environment for the brushless DC motor 2 in the walking assist device 50 to control the coil current of each phase, so that the coil temperature is appropriately controlled so as to be equal to or lower than a guaranteed temperature of the upper limit.

What is claimed is:

1. A motor control device comprising:
a coil temperature detection unit which detects a coil temperature of a motor;
an upper limit current determination unit which determines an upper limit value of a coil current in which a coil temperature after a lapse of a first predetermined time from a present time is maintained at an upper limit temperature or lower every time a second predetermined time shorter than the first predetermined time elapses by using the coil temperature detected by the coil temperature detection unit; and
a coil current control unit which controls the coil current so as to be equal to or lower than the upper limit value,
wherein the upper limit current determination unit is configured to determine the upper limit value of the coil current by using a present coil temperature as the coil temperature and using the upper limit temperature and the first predetermined time.

2. The motor control device according to claim 1, wherein:
the motor is a three-phase motor;
the coil temperature detection unit is configured to detect an individual-phase coil temperature for each phase of the three-phase motor;
the upper limit current determination unit is configured to determine an individual-phase upper limit value for each phase on the basis of the individual-phase coil temperature; and
the coil current control unit is configured to control each individual-phase coil current so as to be equal to or lower than each individual-phase upper limit value.

3. The motor control device according to claim 2, wherein the coil current control unit:
is configured to set a circle having a radius corresponding to a minimum individual-phase upper limit value among three individual-phase upper limit values with an origin as a center in a d-q coordinate system in which three individual-phase coil currents are represented by one vector with respect to the three individual-phase upper limit values determined for each phase by the upper limit current determination unit;
with respect to a target vector which has the length corresponding to a required torque to the motor and rotates around the origin in synchronization with the rotation of the motor, is configured to correct the length of the target vector so that a tip thereof is contained within the circle in the case where the tip is located outside the circle; and
is configured to control the respective individual-phase coil currents on the basis of the target vector whose length is corrected.

4. The motor control device according to claim 2, wherein the coil current control unit:
is configured to set a polygon in which opposite sides are in parallel to each other and a distance between the opposite sides corresponds to a length double or less than the corresponding individual-phase upper limit value in a d-q coordinate system in which three individual-phase coil currents are represented by one vector with respect to the three individual-phase upper limit values determined for each phase by the upper limit current determination unit;

with respect to a target vector which has a length corresponding to a required torque to the motor and rotates around an origin in synchronization with the rotation of the motor, is configured to correct the length of the target vector so that a tip thereof is contained within the polygon in the case where the tip is located outside the polygon; and is configured to control the respective individual-phase coil currents on the basis of the target vector whose length is corrected.

5. The motor control device according to claim 2, wherein the coil current control unit:

is configured to set a circle having a radius corresponding to a minimum individual-phase upper limit value among three individual-phase upper limit values with an origin as a center and a polygon in which opposite sides are in parallel to each other and a distance between the opposite sides corresponds to a length double or less than an absolute value of the corresponding individual-phase upper limit value, in a d-q coordinate system in which three individual-phase coil currents are represented by one vector with respect to the three individual-phase upper limit values determined for each phase by the upper limit current determination unit;

with respect to a target vector which has a length corresponding to a required torque to the motor and rotates around the origin in synchronization with the rotation of the motor, is configured to correct the length of the target vector so that a tip thereof is contained within the circle in the case where the tip of the target vector is located outside the circle during a period in which the rotation speed of the three-phase motor is equal to or greater than a predetermined value and is configured to correct the length of the target vector so that the tip thereof is contained within the polygon in the case where the tip of the target vector is located outside the polygon during a period in which the rotation speed of the three-phase motor is less than the predetermined value; and is configured to control the respective individual-phase coil currents on the basis of the target vector which has been corrected.

6. A walking assist device comprising:

a motor control device including a coil temperature detection unit which detects a coil temperature of a motor, an upper limit current determination unit which determines an upper limit value of a coil current in which a coil temperature after a lapse of a first predetermined time from a present time is maintained at an upper limit temperature or lower every time a second predetermined time shorter than the first predetermined time elapses by using a coil temperature detected by the coil temperature detection unit, and a coil current control unit which controls the coil current so as to be equal to or lower than the upper limit value, wherein the upper limit current determination unit is configured to determine the upper limit value of the coil current by using a present coil temperature as the coil temperature and using the upper limit temperature and the first predetermined time;

a joint which pivotally supports a thigh frame and a crus frame; and an actuator which contains a motor controlled by the motor control device, drives a joint by using a driving force of the motor, and controls a mutual angle between the thigh frame and the crus frame.

7. A motor control method comprising:

a coil temperature detection step of detecting a coil temperature of a motor;

an upper limit current determination step of determining an upper limit value of a coil current in which a coil temperature after a lapse of a first predetermined time from a present time is maintained at an upper limit temperature or lower every time a second predetermined time shorter than the first predetermined time elapses by using a coil temperature detected in the coil temperature detection step, wherein the upper limit value of the coil current is determined using a present coil temperature as the coil temperature and using the upper limit temperature and the first predetermined time; and a coil current control step of controlling the coil current so as to be equal to or lower than the upper limit value.

* * * * *